(12) United States Patent
Verma et al.

(10) Patent No.: US 11,414,349 B2
(45) Date of Patent: Aug. 16, 2022

(54) ADVANCED MULTI-FUNCTIONAL ASBESTOS FREE THERMAL INSULATING MATERIAL AND THE PROCESS FOR PREPARATION THEREOF

(71) Applicant: Council of Scientific & Industrial Research, New Delhi (IN)

(72) Inventors: Sarika Verma, Madhya Pradesh (IN); Sunil Kumar Sanghi, Madhya Pradesh (IN); Mohammed Akram Khan, Madhya Pradesh (IN); Sanjai Kumar Singh Rathore, Madhya Pradesh (IN); Avanish Kumar Srivastava, Madhya Pradesh (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 16/996,572

(22) Filed: Aug. 18, 2020

(65) Prior Publication Data

US 2021/0053876 A1  Feb. 25, 2021

(30) Foreign Application Priority Data

Aug. 20, 2019 (IN) .............................. 201911033450

(51) Int. Cl.
| | |
|---|---|
| *C04B 14/04* | (2006.01) |
| *C04B 14/28* | (2006.01) |
| *C04B 14/42* | (2006.01) |
| *C04B 18/24* | (2006.01) |
| *C04B 22/16* | (2006.01) |
| *C04B 28/00* | (2006.01) |
| *C04B 28/02* | (2006.01) |
| *C04B 28/34* | (2006.01) |
| *C04B 40/00* | (2006.01) |
| *C04B 26/16* | (2006.01) |
| *C04B 111/12* | (2006.01) |
| *C04B 111/28* | (2006.01) |

(52) U.S. Cl.
CPC .......... *C04B 28/006* (2013.01); *C04B 14/043* (2013.01); *C04B 14/285* (2013.01); *C04B 14/42* (2013.01); *C04B 18/248* (2013.01); *C04B 22/16* (2013.01); *C04B 26/16* (2013.01); *C04B 28/001* (2013.01); *C04B 28/02* (2013.01); *C04B 28/34* (2013.01); *C04B 28/346* (2013.01); *C04B 40/0042* (2013.01); *C04B 40/0082* (2013.01); *C04B 2111/12* (2013.01); *C04B 2111/28* (2013.01); *C04B 2201/30* (2013.01); *Y02W 30/91* (2015.05)

(58) Field of Classification Search
CPC ..... C04B 28/006; C04B 26/16; C04B 28/346; C04B 28/001; C04B 28/02; C04B 22/16; C04B 14/285; C04B 18/248; C04B 14/42; C04B 40/0042; C04B 40/0082; C04B 14/043; C04B 2201/30; C04B 2111/12; C04B 26/32; C04B 28/34; C04B 2111/28; C04B 18/24; C04B 14/04; C04B 14/28; C04B 28/00; C04B 40/00; Y02P 40/10; Y02W 30/91

See application file for complete search history.

(56) References Cited

U.S. PATENT DOCUMENTS

| 4,360,625 | A | * | 11/1982 | Griffith | .................... | C04B 14/38 |
| | | | | | | 524/414 |
| 2014/0026787 | A1 | * | 1/2014 | Amritphale | ......... | C04B 22/0006 |
| | | | | | | 106/697 |
| 2015/0203405 | A1 | * | 7/2015 | Sitaram | ................. | C04B 28/006 |
| | | | | | | 106/618 |

FOREIGN PATENT DOCUMENTS

| CN | 109265109 | A | * | 1/2019 | | |
| IN | 2002DE00352 | | * | 3/2002 | | |
| JP | 2001240458 | A | * | 9/2001 | ........... | C04B 28/186 |

OTHER PUBLICATIONS

JP-2001240458-A, Takahashi et al machine translation (Year: 2001).*
Almeida, T.F., Leite, F.H.G., Faria, R.T. et al. Thermal study of calcium silicate material synthesized with solid wastes. J Therm Anal Calorim 128, 1265-1272 (2017). DOI:10.1007/s10973-017-6100-3 (in the IDS) (Year: 2017).*
W.M.N. Nour, A.A. Mostafa, D.M. Ibrahim, Recycled wastes as precursor for synthesizing wollastonite, Ceramics International, vol. 34, Issue 1, 2008, pp. 101-105. DOI:10.1016/j.ceramint.2006.08.019 (Year: 2008).*
Phuttawong, R., Chantaramee, N., Pookmanee, P., & Puntharod, R. (2015). Synthesis and Characterization of Calcium Silicate from Rice Husk Ash and Shell of Snail *Pomacea canaliculata* by Solid State Reaction. Advanced Materials Research, 1103, 1-7. DOI:10.4028/www.scientific.net/amr.1103.1 (in IDS) (Year: 201).*
CN-109265109-A, Yao machine translation (Year: 2019).*
K. Ahmed, et al., "An Assessment of Rice Husk Ash Modified, Marble Sludge Loaded Natural Rubber Hybrid Composites", J. Mater. Environ. Sci., vol. 4, No. 2, 2013, pp. 205-216.
N. Chantaramee, et al., "Synthesis and Characterization of Calcium Silicate from Rice Husk Ash and Shell of Snail *Pomacea Canaliculata* by Solid State Reaction", ResearchGate, Advanced Materials Research, https://www.researchgate.net/publication/273445083, vol. 1103, Mar. 2015, pp. 1-7.

(Continued)

*Primary Examiner* — Kevin E Yoon
*Assistant Examiner* — Marites A Guino-O Uzzle
(74) *Attorney, Agent, or Firm* — Blank Rome LLP

(57) ABSTRACT

The present invention relates to advanced multi-functional asbestos-free thermal insulating materials utilizing appropriate matrixes comprising nano thermal insulating precursor powder predominantly comprising calcium silicate and calcium magnesium silicate prepared from marble waste powder, rice husk and calcium hexametaphosphate; crushed silica fiberglass and a supporting matrix.

3 Claims, No Drawings

(56) References Cited

OTHER PUBLICATIONS

R. A. Rashid, et al., "Low Temperature Production of Wollastonite from Limestone and Silica Sand through Solid-State Reaction", Journal of Asian Ceramic Societies, vol. 2, 2014, pp. 77-81.

T. F. Almeida, et al., "Thermal Study of Calcium Silicate Material Synthesized with Solid Wastes", J. Therm. Anal. Calorim, 2017, pp. 1265-1272.

K. Ahmed, "Hybrid Composites Prepared from Industrial Waste: Mechanical and Swelling Behavior", Journal of Advanced Research, vol. 6, 2015, pp. 225-232.

A. K. Sabat, et al., "Effect of Marble Dust on Strength and Durability of Rice Husk Ash Stabilized Expansive Soil", International Journal of Civil and Structural Engineering, vol. 1, No. 4, 2011, pp. 939-948.

S. Bhusari, "Industrial Application of Rice Husk Ash (RHA) as a Insulating Material: A Solution for Reduction in Land Pollution", International Journal of Advanced Engineering Technology, vol. VII/Issue I; Jan.-Mar. 2016, pp. 552-553.

\* cited by examiner

ADVANCED MULTI-FUNCTIONAL ASBESTOS FREE THERMAL INSULATING MATERIAL AND THE PROCESS FOR PREPARATION THEREOF

FIELD OF THE INVENTION

The present invention relates to an advanced multi-functional asbestos free thermal insulating materials utilizing appropriate matrixes and the process for preparation thereof.

BACKGROUND AND PRIOR ART OF THE INVENTION

With the exponential escalation in scientific and technological interventions in the area of development of advanced materials in our day to day life, the importance and utilization of thermal insulating material is also increasing due to their wide and irreplaceable role in energy conservation. Insulation is well known to humans from a long time and, the thermal insulating materials play a very wide and important role. The conventionally made thermal insulating materials are broadly categorized in three different types:

1) organic or Cellular insulations (e.g. Polystyrene, Polypropylene and Polyurethane etc.);
2) inorganic or Granular insulations (e.g. perlite expanded, Calcium silicate and vermiculite ETC.);
3) fibrous insulations (e.g., glass mineral wool, rock mineral wool, Ceramic fibre etc.).

Earlier the Asbestos, which is a hydrous magnesium silicate ($Mg_3Si_2O_5$ $(OH)_4$ was used as an ideal material for almost all types of insulation. This naturally occurring mineral has a unique fibrous nature that allows it to take on a cotton-like consistency. Later, it was identified that the irritation caused by the fibers to the end users eventually leads to scarring (fibrosis) in the lungs which make it hard to breathe. Also, it's highly toxic nature having cancer-causing effects were revealed. Calcium orthosilicate $Ca_2SiO_4$ was later used as the safe replacement material especially for high-temperature insulation materials. Conventionally, the Calcium silicate insulation is manufactured from amorphous silica, lime, reinforcing fibers and other additives which are mixed with water in a batch mixing tank to form slurry. The slurry is pumped to a pre-heater, where it is heated to boiling and quickly poured into molds to obtain the conventional thermal insulating material by using conventional raw material which is highly costly and require a tiresome, energy intensive process for their manufacturing. The conventional materials have limited functionality as they are basically made up of single phase compound with specific focused property.

In view of the above, there is an urgent need to develop a novel process for making "Advanced multifunctional Asbestos-Free Thermal Insulating Material possessing additional functionality like a) fire resistance, b) heat resistance etc. by employing an appropriate novel matrix for the fabrication of such type of low cost advanced thermal insulating materials. This concept motivated material scientist to develop a novel process for making advanced asbestos-free thermal insulating material by utilizing unique combination of chemical constituents and mineralogical phases present in both industrial as well as agricultural by-products namely marble waste and rice husk which are basically no cost raw materials.

Further, the marble waste is easily available and is worldwide generated from the processing of limestone and therefore, its disposal has become major environmental concern. The chemical constituents and mineralogical phases present in marble waste includes majority of CaO (calcite) calcium oxide, and $SiO_2$ (quartz), Silicon dioxide, along with minor presence of MgO (magnesia), magnesium oxide, $Al_2O_3$, (alumina), Aluminum oxide, $Fe_2O_3$ (hematite), ferric oxide, chromium oxide, zinc oxide and titanium oxide respectively.

Rice husk (RH) is another agricultural by-product which is produced in large quantity all over the world and has disposal problems too. The chemical constituents and mineralogical phases of RH, includes majority of amorphous silica and carbon containing compounds respectively.

The developed ingenious process involves mechano-chemical dry grinding of these industrial by-products for appropriate physico-chemical consolidation, densification followed by microwave irradiation and ceramic treatment; wherein synergistic and simultaneously chemical reactions occurs among the inherently present various chemical compositions and mineralogical phases like CaO (calcite) calcium oxide, and $SiO_2$ (quartz) Silicon dioxide, along with minorly available MgO (magnesia), magnesium oxide, $Al_2O_3$, (alumina), Aluminum oxide, ferric oxide, $Fe_2O_3$ (hematite), chromium oxide, zinc oxide and titanium oxide in marble waste powder along with complementary various chemical compositions and mineralogical phases present in agricultural waste i.e rice husk includes majority of amorphous silica and carbon containing compounds respectively to form the advanced tailored nano thermal insulating powder which was further used for developing advanced multifunctional asbestos-free thermal insulating materials using various appropriate novel matrixes with the desired product majorly having calcium silicate, calcium orthosilicate $Ca_2SiO_4$, along with other inorganic, non-combustible multiphase's compounds of calcium, magnesium like calcium magnesium silicate etc. The developed advanced multifunctional asbestos-free thermal insulating materials in the form of tiles/blocks/panels are light weight, high strength, low thermal conductive, easy to install, reliable and durable product, which are useful for broad application spectrum.

Further, apart from achieving scientific, technological and multi-functional characteristics in the "advanced multifunctional asbestos-free thermal insulating material of present disclosure, the presently disclosed process is—economic, feasible, simple, cheap, highly energy efficient, increases production efficiency and environmental friendly. Therefore, the present disclosure enables wide spread utilization for broad application spectrum. The presently disclosed technology will not only help in developing energy conservation material but also helps in reducing the large quantity of industrial as well as agricultural waste. The use of presently disclosed "advanced multifunctional asbestos-free thermal insulating material" lies in the areas from broad application spectrum ranging from aerospace, automobile, electronics, transportation, construction and other industries, specifically for:

1) internal walls, partitions and ceilings,
2) external walls & ceilings,
3) use as a sub-roof board, underlay board for floor and wall tiling etc., and
4) for decorative applications, as a fire protective solution.

Reference may be made to article "An assessment of Rice husk Ash modified marble sludge loaded natural rubber hybrid composites" by khalil Ahmed et al. in Journal matter, environ. sci. 4 (2) (2013) 205-216 wherein Marble sludge (MS) and rice husk has been used for making Natural Rubber hybrid composites. The drawback of the process is 1) it is merely a physical mixture of raw materials which is simply loaded in natural rubber for making hybrid composites. Physico-chemical, mechanical grinding of the raw materials followed by the ceramic treatment has not been done and thus no chemical reactions/changes have been reported in the product so formed. 2) The concept is not focused on developing advanced thermal insulating material.

Reference may be made to article "Synthesis and Characterization of Calcium Silicate from Rice husk Ash and Shell of Snail *Pomacea Canaliculata* by Solid State Reaction" by Rimruthai Phuttawong in Advanced Materials Research Vol. 1103 (2015) pp 1-7 wherein Calcium silicate was successfully synthesized using agricultural by-product such as Rice husk ash and shell of snail namely *Pomacea canaliculata* by solid state reaction. The drawback of the process 1) the process involves the use of scarcely as well as important fresh water species namely, Snail *Pomacea Canaliculata* and thus reported process cannot be commercialized at larger scale.

Reference may be made to article "Low temperature production of wollastonite from limestone and silica sand through solid-state reaction" by Rashita Abd Rashid in Journal of Asian Ceramic Societies 2 (2014) 77-81 wherein Wollastonite was produced using solid-state reaction from limestone and silica sand. The drawback of the process is: 1) the use of costly pure chemical.

Reference may be made to article, "Thermal study of calcium silicate material synthesized with solid wastes" by T. F. Almeida etal. in Therm Anal Calorim (2017) 128:1265-1272, wherein the work focuses on the thermal characterization of a calcium silicate-based material synthesized with different solid wastes (chamotte and marble) for use as thermal insulation material. The drawback of the process is 1) use of costly pure chemical.

Reference may be made to article "Hybrid composites prepared from Industrial waste: Mechanical and swelling behaviour" by Khalil Ahmed in Journal of Advanced Research (2015) 6, 225-232, wherein hybrid composites were developed from the combination of industrial waste, as marble waste powder (mwp) with conventional fillers, carbon black (cb) as well as silica as reinforcing material, incorporated with natural rubber (nr). The drawback of the process is 1) use of costly pure chemical, i.e. carbon black and silica.

Reference may be made to article "Effect of marble dust on strength and durability of Rice husk ash stabilised expansive soil" by Akshaya Kumar Sabat in Inter. J. Civil And Structural Eng. Volume 1, No 4,2011, wherein the reported work involves investigation of the effect of Marble dusts on strength and durability of an expansive soil stabilized with optimum percentage of Rice huskash. The process is not based on development of thermal insulating material.

Reference may be made to article "Industrial application of Rice husk ash as an insulating material: a solution for reduction in land pollution" By Sarika Bhusari, International Journal of Advanced Engineering Technology Int J Adv Engg Tech/Vol. VII/Issue I/January-March.,2016/552-553, wherein the rice husk alone was washed, grinded and mixed with Pigment Gum to develop a circular material. The drawback of the process is that the developed product consists of single phase material.

Further, from the hitherto reported prior art it is clear that "advanced multi-functional asbestos-free thermal insulating materials utilizing appropriate novel matrixes utilizing specific agricultural waste and industrial waste namely marble wastes and Rice husk has not been pursued at all.

The various issues that need to be addressed and problems to be solved for making "advanced multifunctional asbestos-free thermal insulating material utilizing industrial and agricultural waste are:

1) use of costly pure chemicals like carbon black, silica and lime stone etc.

2) process is dependent on the need of scarcely available as well as biologically diverse important fresh water species like Snail *Pomacea Canaliculata*.

3) various conventional processes involve merely the physical mixing of the raw materials there is no physico-chemical, mechanical and ceramic treatment in the raw materials.

4) the prior art product developed consists of single phase material only. However, multiple phase's constituents responsible for providing thermal insulating property in the developed product is required.

5) various conventional processes involve merely the physical mixing. There is no use of microwave irradiation for developing effective multifunctional thermal

OBJECTIVES OF THE INVENTION

The main objective of the present invention is to provide an advanced multi-functional asbestos-free thermal insulating materials utilizing appropriate matrixes and the process for preparation thereof.

The use of presently disclosed "advanced multi-functional asbestos-free thermal insulating materials utilizing appropriate matrixes" lies in broad application spectrum ranging from aerospace, automobile, electronics, transportation, construction and other industries, specifically for: 1) internal walls, partitions and ceilings, 2) external walls & ceilings, 3) use as a sub-roof board, underlay board for floor and wall tiling etc. 4) for decorative applications, as a fire protective solution which obviates the drawbacks of the hitherto known prior art as detailed above.

Another objective of the present invention is involving simultaneous and synergistic chemical reactions of various mineralogical and chemical compounds calcite, quartz along with minorly available magnesia, alumina, hematite etc. in marble waste powder along with complementary various chemical compositions and mineralogical phases present in agricultural waste i.e. rice husk which includes majority of amorphous silica and carbon containing compounds and very lesser quantity of alumina, calcite and magnesia to obtain the fine advanced tailored nano-thermal insulating powder.

Another objective of the present invention is to provide a novel process involving simultaneous and synergistic chemical reactions of various mineralogical and chemical compounds of marble waste with various complementary constituents of rice husk in novel matrixes enabling development of advance multifunctional asbestos free thermal insulating material.

Another objective of the present invention is to provide an advanced thermal insulating material which involves obviating the use of conventionally used toxic asbestos as well as pure chemicals like calcium silicate etc.

Still another objective of the present invention is to obtain desired homogeneous matrix by chemically designed and mineralogical formulated compositions using various complementary precursors present in marble waste powder, rice husk and various other constituents.

Still another objective of the present invention is a novel approach of making advanced asbestos-free thermal insulating material. The matrixes used are advanced inorganic geopolymer matrix, advanced organo-chemical matrix, advanced putty and cement matrix and advanced phosphatic material based matrix.

Yet another objective of the present invention is enabling the development of simple, highly energy efficient, environmental friendly and highly cost effective process enabling wide spread utilization of developed material for broad application spectrum ranging from aerospace, automobile, electronics, transportation, construction and other industries etc.

Yet another objective of the present invention is non-complicated simple process as it involves appropriate physico-chemical, mechanical and microwave irradiation followed by ceramic processing of complementary raw materials along with novel matrixes and obviates the need of complicated steps and instruments as required in the conventional processes.

Yet another objective of the present invention is development of multi-functional asbestos free thermal insulating materials possessing a) heat resistance, b) fire resistance and c) light weight and durability aspects too.

Yet another objective of the present invention is to solve the disposal problem of both the waste i.e. marble waste and rice husk too and to save the environment all over the world.

SUMMARY OF THE INVENTION

Accordingly, the present invention provides a multi-functional asbestos free thermal insulating material comprising:
 i. nano thermal insulating precursor powder predominantly comprising calcium silicate and calcium magnesium silicate prepared from 45.45-49.50-% of marble waste powder, 45.45-49.50-% of Rice husk and 1 to 9.1% of calcium hexametaphosphate;
 ii. crushed silica fiberglass; and
 iii. a supporting matrix;
wherein the ratio of nano thermal insulating precursor powder, crushed silica fiberglass and the supporting matrix is in the range of 10:3:2.9 to 60:8:75.

In an embodiment of the present invention, the supporting matrix is selected from the group consisting of inorganic geopolymeric matrix, organo-chemical matrix, conventional putty matrix, conventional cement matrix and phosphatic matrix.

In a preferred embodiment of the present invention, the geopolymeric matrix comprises of 68.62-68.96% fly ash, 8.82% 8.82-10.34% potassium hydroxide, 3.45-4.90% potassium silicate and 17.25-17.64% of water.

In a preferred embodiment of the present invention, the organo-chemical matrix comprises of tri poly-isocyanate and polyol in 1:1 ratio.

In a preferred embodiment of the present invention, the phosphatic matrix comprises of ortho phosphoric acid or sodium hexametaphosphate.

The present invention also provides a process for preparing a multi-functional asbestos free thermal insulating material comprising the steps of:
 a. dry grinding of 45.45-49.50-% of marble waste powder, 45.45-49.50-% of Rice husk and 1 to 9.1% of calcium hexametaphosphate in a ball mill or planetary mill for the period of 8 to 10 hours to obtain a grinded powder or planetary mill for the period of 8 to 10 hours to obtain a grinded powder;
 b. mixing the grinded powder to aqueous solution of 50-80% potassium hydroxide to obtain a reaction mixture;
 c. irradiating the reaction mixture obtained in step (b) in microwave power of 200-350 watts for a duration of 10-15 minutes to obtain a precipitate;
 d. filtering the precipitate obtained in step (c) and drying it at 100° C.-110° C. to obtain solid powder of homogenized nano thermal insulating precursor and
 e. treating the homogenized nano thermal insulating precursor obtained in step (d) with supporting matrix selected from the group consisting of inorganic geopolymeric matrix, organo-chemical matrix, putty matrix, cement matrix and phosphatic matrix to obtain a multi-functional asbestos free thermal insulating material.

In a preferred embodiment, the geopolymeric matrix based thermal insulating material is obtained by the steps comprising of:
 a. mixing 62.9-76.75% of the homogenized nano thermal insulating precursor with 18.25-13.05% geopolymeric matrix comprising 68.96-68.62% fly ash, 10.34-8.82% potassium hydroxide and 3.45-4.90% potassium silicate and 17.25-17.64% of water to obtain a mixture;
 b. mixing 10.20-18.85% crushed silica fiberglass to the mixture obtained in step (a) and
 c. compacting the material so obtained in step (b) in the form of tiles of required dimensions at a compaction pressure of 100-200 kg/cm$^2$ and heating the tiles in an electric furnace at a temperature range of 1100-1200° ° C. for a period of 2 to 3 hours.

In a preferred embodiment, the organo-chemical based thermal insulating materials obtained by the steps comprising of:
 a. mixing 62.5-80% of the homogenized nano thermal insulating precursor with 9.34-18.75% crushed silica fiberglass to obtain a mixture;
 b. compacting the mixture obtained in step (a) at a compaction pressure of 100-200 kg/cm$^2$ and
 c. heating the compacted mixture obtained in step (b) in an electric furnace at a temperature range of 1100-1200° C. for a period of 2 to 3 hours, followed by crushing and blending it with 10.66-18.75% of tri poly-isocyanate and polyol at a ratio of 1:1 ratio and compacting in the form of sheet of required dimensions.

In a preferred embodiment, the putty matrix based or cement matrix based thermal insulating materials obtained by the steps comprising of;
 a. mixing 66.65-81% of the homogenized nano thermal insulating precursor with 11-20% crushed silica fiberglass to obtain a mixture;
 b. compacting the mixture obtained in step (a) at a compaction pressure of 100-200 kg/cm$^2$; and
 c. heating compacted mixture obtained in step (b) in an electric furnace at a temperature range of 1100-1200° C. for a period of 2 to 3 hours, followed by crushing and blending it with 8.0-13.35% of conventional putty or 8.0-13.35% of conventional cement.

In a preferred embodiment, the phosphatic matrix based thermal insulating material is obtained by the steps comprising of:
 a. mixing 71.43-82.20% of the homogenized nano thermal insulating precursor with 10.95-21.42% crushed silica fiberglass to obtain a mixture;
 b. blending the mixture obtained in step (a) with 6.85-7.15% of ortho phosphoric acid or sodium hexametaphosphate; and
 c. compacting the material so obtained in step (b) in the form of tiles of required dimension at a compaction pressure of 100-200 kg/cm² and heating the tiles in an electric furnace at a temperature range of 1100-1200° C. for a period of 2 to 3 hours.

DETAILED DESCRIPTION OF THE INVENTION

The main field of the present invention essentially involves development of an advanced multi-functional asbestos-free thermal insulating materials utilizing appropriate novel matrixes and the process thereof. The use of the developed advanced multi-functional asbestos-free thermal insulating materials utilizing appropriate matrixes lies in broad application spectrum ranging from aerospace, automobile, electronics, transportation, construction and other industries, specifically for: 1) internal walls, partitions and ceilings, 2) external walls & ceilings, 3) use as a sub-roof board, underlay board for floor and wall tiling etc.4) for decorative applications, as a fire protective solution.

The novel and innovative process for making advanced non-toxic Asbestos-Free Thermal Insulating Material is developed by utilizing unique combination of chemical constituents and mineralogical phases present in both industrial as well as agricultural by products namely marble waste and rice husk which are basically no cost raw materials, wherein mechano-chemical dry grinding of these industrial by products for appropriate physico-chemical consolidation, followed by microwave irradiation and ceramic processing; wherein synergistic and simultaneously chemical reactions occurs among the inherently present various chemical compositions and mineralogical phases like calcium oxide, CaO (calcite) and Silicon dioxide, $SO_2$ (quartz) along with minorly available magnesium oxide, MgO (magnesia), Aluminum oxide, $Al_2O_3$, (alumina), ferric oxide, $Fe_2O_3$ (hematite), chromium oxide, zinc oxide and titanium oxide in marble waste powder along with complementary various chemical compositions and mineralogical phases present in agricultural waste, i.e rice husk, includes majority of amorphous silica and carbon containing compounds respectively to form the—advanced tailored nano thermal insulating powder which was further used along with appropriate novel matrix for making advanced multifunctional asbestos-free thermal insulating materials using various appropriate novel matrixes with the desired product majorly having calcium silicate, calcium orthosilicate $Ca_2SiO_4$, along with other inorganic, non-combustible multiphase's compounds of calcium, magnesium etc. like calcium magnesium silicate, which inherently have good thermal insulating properties. The developed advanced multifunctional asbestos-free thermal insulating materials in the form of tiles/blocks/panels are light weight, high strength, low thermal conductive, easy to install, reliable and durable product useful for broad application spectrum.

Further, apart from achieving scientific, technological and functional characteristics in the developed "Advanced multi-functional asbestos-free thermal insulating materials utilizing appropriate novel matrixes, the process is techno-economic feasible, simple, cheap, highly energy efficient, increases production efficiency and environmental friendly and therefore, enabling wide spread utilization for broad application spectrum. The presently disclosed technology will not only help in developing energy conservation material but also helps in utilizing the large quantity of industrial as well as agricultural waste, thereby, saving the environment from the harmful effects of these waste, like burning of agriculture waste causes pollution etc.

Further, process essentially involves a novel process for making advanced multifunctional asbestos-free thermal insulating material utilizing marble waste and agricultural waste and the process thereof.

The inventiveness of the process of the present invention essentially lies in that:

1) The process involves simultaneous and synergistic chemical reactions of various mineralogical and chemical compounds calcium carbonate, of marble waste with complementary various chemical precursor present in agricultural waste rice husk includes majority of amorphous silica and carbon containing compounds respectively to form nano material to obtain the homogenized tailored nano thermal insulating precursor powder.

2) The process involves the tailored thermal insulating material so obtained having multi insulating phases due to presence of multi elemental Ca,Si,O,Mg etc.

3) The process involves simultaneous and synergistic chemical reactions of various mineralogical and chemical compounds of marble waste with various constituents of novel matrixes enabling homogeneous thermal insulating matrix with desired functionality.

4) The process involves advanced thermal insulating material which obviates the use conventionally used asbestos and other pure and costly chemicals like calcium silicate etc.

5) Desired homogeneous thermal insulating matrix by chemically designed and mineralogical formulated compositions is obtained by using various complementary precursors present in marble waste and rice husk.

6) The process involves making advanced asbestoses-free thermal insulating material by utilizing novel matrixes. The novel matrixes involved are: 1)—advanced Inorganic Geo-polymer matrix, 2)—advanced organo chemical matrix, 3)—advanced putty and cement matrix, and 4)—advanced phosphatic material based matrix.

7) The process developed is simple, highly energy efficient, environmental friendly and highly cost effective enabling wide spread utilization of developed material for broad application spectrum ranging from aerospace, automobile, electronics, transportation, construction and other industries etc.

8) The developed process is simple as it involves only physico-chemical mechanical activation, microwave irradiation and ceramic processing of marble waste as well as agricultural waste.

10) The thermal insulating material developed is: a) heat resistance, b) fire resistance, c) light weight and durability aspects etc.

To overcome the drawbacks of the hitherto to known processes, the present process involves the following:

1) The process involves simultaneous and synergistic chemical reactions of various mineralogical and chemical compounds. Calcium carbonate of marble waste with complementary various chemical compounds present in agricultural waste rice husk, includes majority of amorphous silica and carbon containing compounds, respectively to obtain the fine tailored thermal insulating material.

2) The tailored thermal insulating material obtained by the process of the present invention is having multi insulating phases due to presence of multi elemental Ca,Si,Mg,O etc.

3) The process involves simultaneous and synergistic chemical reactions of various mineralogical and chemical compounds of marble waste with various constituents of novel matrixes enabling homogeneous thermal insulating matrix with desired functionality.

4) The process in present invention produce advanced thermal insulating material which obviates the use of conventionally used asbestos and other pure and costly chemicals like calcium silicate etc.

5) To obtain desired homogeneous thermal insulating matrix by chemically designed and mineralogical formulated compositions using various complementary precursors present in marble waste and rice husk.

6) To enables making of advanced asbestoses-free thermal insulating material utilizing novel matrixes. The matrixes used are advanced inorganic geopolymer matrix, advanced organo chemical matrix, advanced putty and cement matrix and advance phosphatic material based matrix.

7) The process developed is simple, highly energy efficient, environmental friendly and highly cost effective enabling wide spread utilization of developed material for broad application spectrum ranging from aerospace, automobile, electronics, transportation, construction and other industries etc.

8) The developed process is simple as it involves only physico-chemical mechanical, microwave irradiation and ceramic processing of marble waste as well as agricultural waste.

10) Another aspect in present invention is development of thermal insulating material having a) heat resistance, b) fire resistance, c) light weight and durability aspects etc.

In conclusion, the process of the present invention enables for making an advanced multi-functional asbestos-free thermal insulating materials utilizing appropriate novel matrixes and the process thereof.

The use of developed advanced multi-functional asbestos-free thermal insulating materials utilizing appropriate novel matrixes and the process thereof lies in the areas from broad application spectrum ranging from aerospace, automobile, electronics, transportation, construction and other industries etc.

Accordingly the present invention provides, an advanced multi-functional asbestos-free thermal insulating materials utilizing appropriate novel matrixes and the process thereof. The process comprises together dry grinding of 100 g-500 g of marble waste powder, 100 g-500 g of rice husk and 20 g-100 g of calcium hexametaphosphate in a ball mill or planetary mill etc. for the period of 8 to 10 hours, followed by mixing it in solution of 50 g-125 g potassium hydroxide in 100 ml to 250 ml water and further the reaction mixture was irradiated in microwave power of 200-350 watts for a duration of 10-15 minutes and the precipitate so obtained was filtered and dried in an air oven at 100° C. for duration of two hours resulting in the preparation of solid powder of homogenized tailored nano thermal insulating precursor, which was further treated along with either of the novel matrixes like:

a) "Advanced Inorganic Geopolymeric matrix" for obtaining heat resistance properties in the thermal insulating material by taking 100 g-600 g of tailored nano thermal insulating precursor powder and mixing it with ground powder of 20 g-70 g fly ash, 3 g-9 g potassium hydroxide and 1 g-5 g potassium silicate and 5 ml-18 ml of water and 30 g-80 g crushed silica fiberglass and the material so obtained was compacted in the form of tiles of dimension 10 cm×10 cm×10 mm at a compaction pressure of 100-200 kg/cm$^2$ and was further heated in an electric furnace in the temperature range of 1100-1200° C. only for a period of 2 to 3 hours, b) Advanced Organo-chemical matrix by taking 100 g-600 g of tailored nano thermal insulating precursor powder, 30 g-80 g crushed silica fiberglass and compacted at a compaction pressure of 100-200 kg/cm$^2$ then was further heated in an electric furnace in the temperature range of 1100-1200° C. only for a period of 2 to 3 hours, followed by crushing and further blending it with 30 g to 70 g of: a) tri poly-isocyanate, and b) polyol in 1:1 ratio and was compacted in the form of sheet of dimensions 10 cm×10 cm×8 mm to obtain Advance Hybrid Organo chemical based thermal insulating material, c) Advanced putty matrix based material for plastering the rooms by taking 100 g-600 g of tailored nano thermal insulating precursor powder, 30 g-80 g crushed silica fiberglass and was compacted at a compaction pressure of 100-200 kg/cm$^2$ then was further heated in an electric furnace in the temperature range of 1100-1200° C. only for a period of 2 to 3 hours, followed by crushing and blending it with 20 g to 60 g of conventional putty and applying on wall by adapting conventional practices, d) Advanced cement matrix based material for plastering the room by taking 100 g-600 g of tailored nano thermal insulating precursor powder, 30 g-80 g crushed silica fiberglass and was compacted at a compaction pressure of 100-200 kg/cm$^2$ then was further heated in an electric furnace in the temperature range of 1100-1200° C. only for a period of 2 to 3 hours, followed by crushing and blending it with 10 g to 50 g of conventional cement and applying on wall by adapting conventional practices, e) Advanced phosphatic matrix based material by taking 100 g-600 g of tailored nano thermal insulating precursor powder, 30 g-80 g crushed silica fiberglass and blending it with 10 ml to 50 ml of conventional ortho phosphoric acid or sodium hexametaphosphate and the material so obtained was compacted in the form of tiles of dimension 10 cm×10 cm×10 mm at a compaction pressure of 100-200 kg/cm$^2$ and was further heated in an electric furnace in the temperature range of 1100-1200° C. only for a period of 2 to 3 hours, to obtain advanced multi-functional asbestos-free thermal insulating materials.

The process comprises dry grinding of 100 g-500 g of marble waste powder, 100 g-500 g of Rice husk and 20 g-100 g of calcium hexametaphosphate in a ball mill or planetary mill etc. for the period of 8 to 10 hours, adding the solution containing 50 g-125 g potassium hydroxide in 100 ml to 250 ml water in above grinded powder and further the reaction mixture was irradiated in microwave power of 200-350 watts for duration of 10-15 minutes. Filtration of above obtained precipitate and was dried in an air oven at 100° C. for duration of two hours resulting in the preparation of solid powder of homogenized tailored nano thermal insulating precursor.

The present invention provides a process in which above obtained homogenized tailored nano thermal insulating precursor powder for making advanced multi-functional asbestos-free thermal insulating materials using advanced and conventional matrixes.

The present invention provides a process for obtaining heat resistance properties in the thermal insulating material by using advanced geo polymer matrix by taking 100 g-600 g of tailored nano thermal insulating precursor powder and mixing it with ground powder of 20 g-70 g fly ash, 3 g-9 g potassium hydroxide and 1 g-5 g sodium silicate and 5 ml-18 ml of water and 30 g-80 g crushed silica fiberglass and the material so obtained was compacted in the form of tiles of dimension 10 cm×10 cm×10 mm at a compaction pressure of 100-200 kg/cm$^2$ and was further heated in an electric furnace in the temperature range of 1100-1200° C. only for a period of 2 to 3 hours.

The present invention provides a process for obtaining very light weight properties in the thermal insulating material using advanced organo chemical based matrix by taking 100 g-600 g of tailored nano thermal insulating precursor powder, 30 g-80 g crushed silica fiberglass and compacted at a compaction pressure of 100-200 kg/cm$^2$ then was further heated in an electric furnace in the temperature range of 1100-1200° C. only for a period of 2 to 3 hours, followed by crushing and further blending it with 30 g to 70 g of a) tri poly-isocyanate and b) polyol in 1:1 ratio and was compacted in the form of sheet of dimensions 10 cm×10 cm×8 mm for obtaining Advanced light weight Organo chemical based thermal insulating material.

The present invention provides a process for obtaining thermal material using advanced putty matrix based material for plastering the rooms by taking 100 g-600 g of tailored nano thermal insulating precursor powder, 30 g-80 g crushed silica fiberglass and was compacted at a compaction pressure of 100-200 kg/cm$^2$ then was further heated in an electric furnace in the temperature range of 1100-1200° C. only for a period of 2 to 3 hours, followed by crushing and blending it with 20 g to 60 g of conventional putty and applying on wall by adapting conventional practices.

The present invention provides a process for obtaining an advance cement matrix based thermal insulating material for plastering the room is developed by taking 100 g-600 g of tailored nano thermal insulating precursor powder, 30 g-80 g crushed silica fiberglass and was compacted at a compaction pressure of 100-200 kg/cm$^2$ then was further heated in an electric furnace in the temperature range of 1100-1200° C. only for a period of 2 to 3 hours, followed by crushing and blending it with 10 g to 50 g of conventional cement and applying on wall by adapting conventional practices.

The present invention provides a process for obtaining an advance phosphatic matrix based thermal insulating material for plastering the room is developed by taking 100 g-600 g of tailored nano thermal insulating precursor powder, 30 g-80 g crushed silica fiberglass and blending it with 10 ml to 50 ml of conventional ortho phosphoric acid or sodium hexametaphosphate and the material so obtained was compacted in the form of tiles of dimension 10 cm×10 cm×10 mm at a compaction pressure of 100-200 kg/cm$^2$ and was further heated in an electric furnace in the temperature range of 1100-1200° C. only for a period of 2 to 3 hours, to obtain advanced multi-functional asbestos-free thermal insulating materials.

The novel and inventive step in the present invention involves simultaneous and synergistic chemical reactions of various mineralogical and chemical compounds Calcite, quartz, magnesia, alumina, hematite of marble waste with complementary various chemical compounds like amorphous silica, carbon containing compounds etc. in agricultural waste, Rice husk along with minorly available calcium hexametaphosphate to obtain the homogenized tailored thermal insulating precursor powder.

The novel and inventive step in the present invention is the homogenized tailored thermal insulating precursor powder so obtained is having multiple phases due to presence of multi elemental Ca, CaO,Si, OR, Mg etc.

The novel and inventive step in the present invention is the homogenized tailored thermal insulating precursor powder so obtained possesses particles in nano size.

The novel and inventive step in the present invention is physico-chemical mechanical reactions among "tailored thermal insulating powder" and various constituents of novel matrixes enabling homogeneity matrix with desired functionality. The present invention provides advanced "homogenized tailored thermal insulating precursor powder" which is devoid of conventionally used asbestoses, pure and costly chemicals like calcium silicate etc.

The other novel and inventive step in present invention is to obtain desired homogeneous thermal insulating matrix by chemically designed and mineralogical formulated compositions using various complementary precursors present in marble waste, rice husk and various constituents of novel matrixes. The process saves the cost of costly chemicals inherently present in marble waste and rice husk like amorphous silica, carbon containing compounds etc., otherwise required for making thermal insulating material.

The following examples are given by way of illustration of the working of the invention in actual practice and therefore should not be construed to limit the scope of the present invention in any way.

The present invention used Rice Husk obtained from trader MIS Value recyclers and reclaimers Pvt. Ltd., Mandideep, Bhopal.

EXAMPLE 1

For making Advanced Multi-Functional Asbestos Free Thermal Insulating Materials Utilizing Appropriate Novel Matrixes like in "Advanced inorganic geopolymer matrix" for obtaining heat resistance properties in the thermal insulating material, comprises of together dry grinding of 100 gm marble waste powder, 100 g Rice husk and 20 gm calcium hexametaphosphate in a ball mill for the period of 8 hours. The above grinded powder was mixed in solution containing 50 g potassium hydroxide in 100 ml water and the reaction mixture was irradiated in microwave power of 200 watts for duration of 15 minutes. The precipitate so obtained was filtered and dried in oven at 100° C. to form homogenized tailored nano thermal insulating precursor powder. Further, 100 g of tailored nano thermal insulating precursor powder was mixed with 30 g crushed silica glass fiber, ground powder of 20 gm fly ash, 3 gm potassium hydroxide and 1 gm potassium silicate and 5 ml of water. The material so obtained was compacted in the form of tiles of dimension 10 cm×10 cm×10 mm at a compaction pressure of 100 kg/cm$^2$ and was further heated in an electric furnace in the temperature range of 1100° C. only for a period of 2 hours.

The thermal conductivity of the developed sample having thickness 5 mm was studied and found to be 0.0657 w/mk. The density of the developed product is found to be 1.16 g/cm$^3$. The impact strength of the sample was found to be 0.028 kgfm.cm$^{-1}$ and water absorption in the range of 8% respectively.

EXAMPLE 2

For making Advanced Multi-Functional Asbestos-Free Thermal Insulating Materials Utilizing Appropriate Novel Matrixes like in "Advanced inorganic geopolymer matrix" for obtaining heat resistance properties in the thermal insulating material, comprises of together dry grinding of 500 gm marble waste powder, 500 gm Rice husk and 100 gm calcium hexametaphosphate in a ball mill for the period of 10 hours. The above grinded powder was mixed in solution containing 125 gm potassium hydroxide in 100 ml water and the reaction mixture was irradiated in microwave power of 350 watts for duration of 10 minutes. The precipitate so obtained was filtered and dried in oven at 100° C. for two hours to form homogenized tailored nano thermal insulating precursor powder. Further, 600 gm of tailored nano thermal insulating precursor powder was mixed with 80 gm crushed silica glass fiber, ground powder of 70 gm fly ash, 9 gm potassium hydroxide and 5 gm potassium silicate and 18 ml of water. The material so obtained was compacted in the form of tiles of dimension 10 cm×10 cm×10 mm at a compaction pressure of 100 kg/cm² and was further heated in an electric furnace in the temperature range of 1200° C. only for a period of 2 hours.

The thermal conductivity of the developed sample having thickness 5 mm was studied and found to be 0.069 w/mk. The density of the developed product is found to be 1.17 g/cm³. The impact strength of the sample was found to be 0.025 kgfm.cm$^{-1}$ and water absorption in the range of 9% respectively.

EXAMPLE 3

For making Advanced Multi-Functional Asbestos-Free Thermal Insulating Materials Utilizing Appropriate Novel Matrixes like in "Advanced organo chemical based matrix" for obtaining for obtaining very light weight properties in the thermal insulating material, comprises of together dry grinding of 400 gm marble waste powder, 300 gm Rice husk and 50 gm calcium hexametaphosphate in a ball mill for the period of 10 hours. The above grinded powder was mixed in solution containing 40 gm potassium hydroxide in 140 ml water and the reaction mixture was irradiated in microwave power of 300 watts for duration of 12 minutes. The precipitate so obtained was filtered and dried in oven at 100° C. to form homogenized tailored nano thermal insulating precursor powder. Further, 300 gm of tailored nano thermal insulating precursor powder was mixed with 80 gm crushed silica fiberglass and compacted at a compaction pressure of 100-200 kg/cm² then was further heated in an electric furnace in the temperature range of 1100-1200° C. only for a period of 2 to 3 hours, followed by crushing and further blending it with 70 gm of: a) tri poly-isocyanate and b) polyol in 1:1 ratio and was compacted in the form of sheet of dimensions 10 cm×10 cm×8 mm for obtaining Advance light weight Organo chemical based thermal insulating material.

The thermal conductivity of the developed sample having thickness 8 mm was studied and found to be 0.0532 w/mk. The density of the developed product is found to be 0.4 g/cm³ and water absorption in the range of 5% respectively.

EXAMPLE 4

For making Advanced Multi-Functional Asbestos-Free Thermal Insulating Materials Utilizing Appropriate Novel Matrixes like in "advance phosphatic matrix based material", comprises of together dry grinding of 250 gm marble waste powder, 250 g Rice husk and 50 g calcium hexametaphosphate in a ball mill for the period of 9 hours to form homogenized tailored nano thermal insulating precursor powder. The above grinded powder was mixed in solution containing 75 g potassium hydroxide in 120 ml water and the reaction mixture was irradiated in microwave power of 250 watts for duration of 15 minutes. The precipitate so obtained was filtered and dried in oven at 100° C. to form homogenized tailored nano thermal insulating precursor powder. Further by taking 600 g of tailored nano thermal insulating precursor powder, 80 g crushed silica glass fiber, with 10 ml of conventional ortho phosphoric acid the material was compacted in the form of tiles of dimension 10 cm×10 cm×10 mm at a compaction pressure of 200 kg/cm² and was further heated in an electric furnace in the temperature of 1200° C. only for a period of 3 hours.

The thermal conductivity of the developed sample having thickness 5 mm was studied and found to be 0.0657 w/mk. The density of the developed product is found to be 1.16 g/cm³. The impact strength of the sample was found to be—0.025 kgfm.cm$^{-1}$ and water absorption in the range of 8% respectively.

EXAMPLE 5

For making Advanced Multi-Functional Asbestos-Free Thermal Insulating Materials Utilizing Appropriate Novel Matrixes like in "Advanced putty matrix based material", comprises of together dry grinding of 250 gm marble waste powder, 250 gm Rice husk and 50 gm calcium hexametaphosphate in a ball mill for the period of 9 hours. The above grinded powder was mixed in solution containing 50 g potassium hydroxide in 100 ml water and the reaction mixture was irradiated in microwave power of 200 watts for duration of 15 minutes. The precipitate so obtained was filtered and dried in oven at 100° C. to form homogenized tailored nano thermal insulating precursor powder. Further by taking 400 gm of tailored nano thermal insulating precursor powder, 80 gm crushed silica glass fiber and was compacted at a compaction pressure of 200 kg/cm² then was further heated in an electric furnace in the temperature range of 1150° C. only for a period of 2 hours, followed by crushing and blending it with 60 gm of conventional putty and applying on wall by adapting conventional practices.

The thermal conductivity of the developed sample having thickness 5 mm was studied and found to be 0.085 w/mk. The density of the developed product is found to be 1.2 g/cm³ and water absorption in the range of 10% respectively.

EXAMPLE 6

For making Advanced Multi-Functional Asbestos-Free Thermal Insulating Materials Utilizing Appropriate Novel Matrixes like in "Advance cement matrix based", comprises of together dry grinding of 400 gm marble waste powder, 300 gm rice husk and 70 gm calcium hexametaphosphate in a ball mill for the period of 9 hours to form homogenized tailored nano thermal insulating precursor powder. The above grinded powder was mixed in solution containing 50 gm potassium hydroxide in 100 ml water and the reaction mixture was irradiated in microwave power of 250 watts for duration of 12 minutes. The precipitate so obtained was filtered and dried in oven at 100° C. to form homogenized tailored nano thermal insulating precursor powder. Further by taking 500 gm of tailored nano thermal insulating precursor powder, 80 gm crushed silica glass fiber and was compacted at a compaction pressure of 200 kg/cm² then was further heated in an electric furnace in the temperature range of 1200° C. only for a period of 2 hours, followed by crushing and blending it with 50 gm of conventional cement and applying on wall by adapting conventional practices.

The thermal conductivity of the developed sample having thickness 5 mm was studied and found to be 0.078 w/mk. The density of the developed product is found to be 1.3 g/cm³ and water absorption in the range of 11% respectively.

The main advantages of the present invention are:

The developed novel process for making involves "Advanced Multi-Functional Asbestos-Free Thermal Insulating Materials Utilizing Appropriate Novel Matrixes and the Process Thereof" is advantageous due to the following reasons:

a) The advantage of the developed novel process is to ensure Holistic utilization of wastes generated both from industry as well as agriculture sector namely marble waste powder and Rice husk for making highly value added material.

b) The advantage of the novel process is it's highly energy efficient process as the novel process involves reaction of raw materials at the comparatively low temperature.

c) The advantage of the novel process involves designing of raw materials and processing parameters, enabling synergistic and simultaneous chemical reactions among the various reactants which enable to obtain nano tailored insulating precursor powder for obtaining advanced asbestos-free thermal insulating material.

d) Other advantage of the developed novel process is to develop product with multifunctional properties like light weight, low thermal conductive, high strength, easy to install, reliable and durable product.

e) Other advantage of the developed novel process is to utilize and save the cost of costly chemicals inherently present in marble waste and Rice husk like silica, carbon derived compounds etc. other vise required for making advanced asbestos-free thermal insulating material.

f) Other advantage of the developed novel process is to solve the disposal problem of both the waste and to save the environment all over the world and thus the process is environment friendly.

The invention claimed is:

1. A multi-functional asbestos-free thermal insulating material comprising:
   i. nano thermal insulating precursor powder comprising calcium silicate and calcium magnesium silicate prepared from 45.45-49.50% of marble waste powder, 45.45-49.50% of Rice husk and 1 to 9.1% of calcium hexametaphosphate;
   ii. crushed silica fiberglass; and
   iii. a supporting matrix comprising an inorganic geopolymeric matrix;
   wherein the ratio of nano thermal insulating precursor powder, crushed silica fiberglass and the supporting matrix is in the range of 10:3:2.9 to 60:8:75.

2. The multi-functional asbestos-free thermal insulating material as claimed in claim 1, wherein the geopolymeric matrix comprises of 68.62-68.96% fly ash, 8.82-10.34% potassium hydroxide, 3.45-4.90% potassium silicate and 17.25-17.64% of water.

3. A process for preparing a multi-functional asbestos free thermal insulating tiles, the process comprising:
   a. dry grinding of 45.45-49.50% of marble waste powder; 45.45-49.50% of rice husk and 1 to 9.1% of calcium hexametaphosphate in a ball mill or planetary mill for a period of 8 to 10 hours to obtain a grinded powder;
   b. mixing the grinded powder to an aqueous solution of 50-80% potassium hydroxide to obtain a reaction mixture;
   c. irradiating the reaction mixture obtained in step (b) in a microwave with a power of 200-350 watts for a duration of 10-15 minutes to obtain a precipitate;
   d. filtering the precipitate obtained in step (c) and drying it at 1000 C-1100 C to obtain a solid powder of homogenized nano thermal insulating precursor;
   e. mixing 62.9-76.75% of the homogenized nano thermal insulating precursor with 13.05-18.25% geopolymeric matrix comprising 68.62-68.96% fly ash, 8.82-10.34% potassium hydroxide and 3.45-4.90% potassium silicate and 17.25-17.64% of water to obtain a mixture;
   f. mixing 10.20-18.85% crushed silica fiberglass to the mixture obtained in step (e) to form a material; and
   g. compacting the material in the form of tiles of 10 cm×10 cm×8 mm to 10 cm×10 cm×10 mm at a compaction pressure of 100-200 kg/cm$^2$ and heating the tiles in an electric furnace at a temperature range of 1100–1200° C. for a period of 2 to 3 hours.

* * * * *